July 17, 1934.   M. H. NEWMAN   1,966,731
ELECTRICAL CONDUIT
Filed Sept. 25, 1931
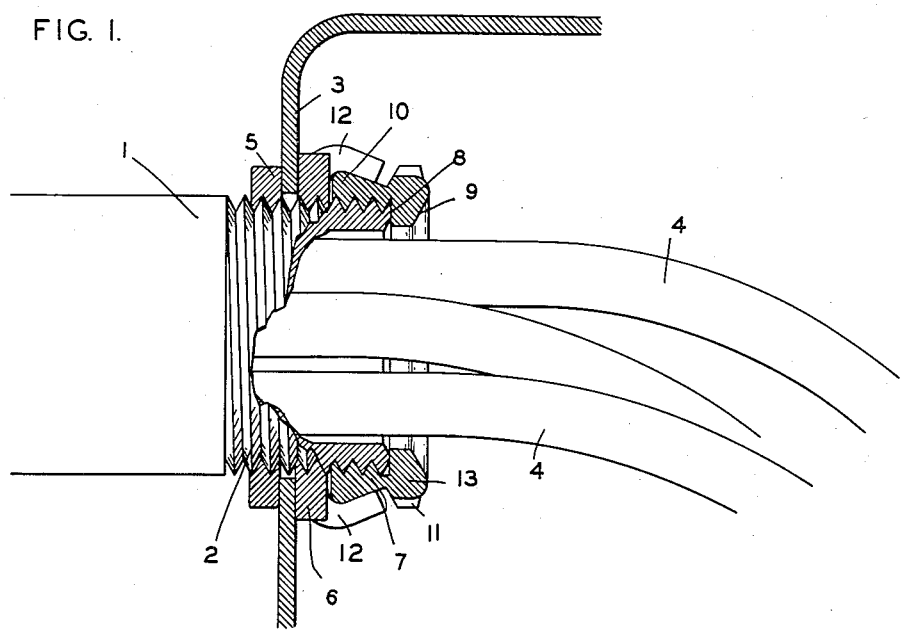
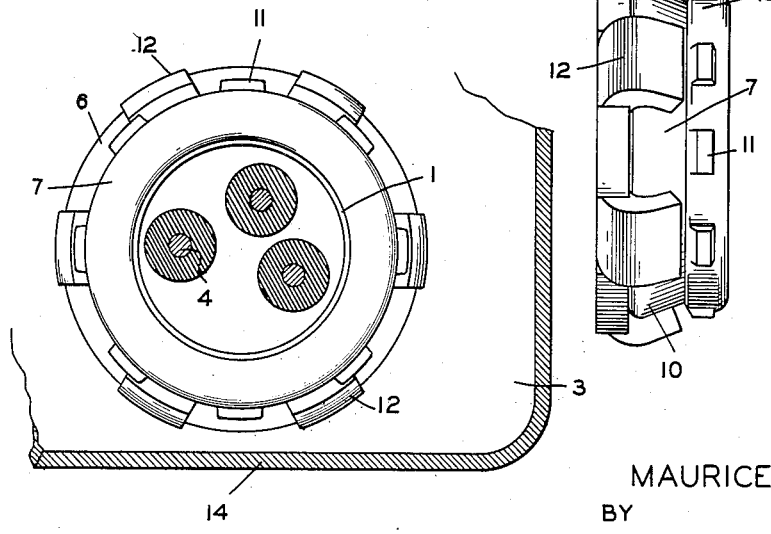
INVENTOR:
MAURICE H. NEWMAN
BY
Baldwin Vale
ATTORNEY.

Patented July 17, 1934

1,966,731

UNITED STATES PATENT OFFICE 1,966,731

ELECTRICAL CONDUIT

Maurice H. Newman, Alameda, Calif.

Application September 25, 1931, Serial No. 565,011

1 Claim. (Cl. 247—43)

This invention relates to improvements in electrical conduits and more particularly to outlet box couplings.

In present practice electrical wiring in buildings is carried in conduits of various kinds, including threaded pipe. The threaded pipe ends enter the outlet boxes to which they are attached by lock nuts. The pipe openings are also guarded with end sleeves.

It is the principal object of the invention to facilitate the assembly of the various parts upon the pipe ends and their connection with the outlet boxes.

Another object is to reduce the number of parts to be handled in the above operation.

A further object is to save the time of the operator in the practice of the art to which this invention applies.

Other objects and advantages will appear as the description progresses.

In this specification and the accompanying drawing the invention is disclosed in its present preferred form. It is to be understood, however, that it is not limited to this form because it may be embodied in other forms without departing from the spirit of the invention as defined in the claims following the description.

In the one sheet of drawing:

Fig. 1 is a fragmentary detail of a pipe end locked in an outlet box in accordance with this invention, the pipe body and enclosed wires being shown in full lines.

Fig. 2 is an end view of the same.

Fig. 3 is a side elevation detail of the combined inner lock nut and end sleeve.

In detail the construction illustrated in the drawing comprises the conduit pipe 1 having the threaded end 2, passing through a hole in the wall 3 of the conventional outlet box. These outlet boxes are concealed within the building walls and provide meeting points for connecting the terminal wires 4 "fished" through the pipes 1.

The pipe ends are fixed in the walls 3 by the running hexagonal nut 5 threaded on the end 2 on the outside of the box and the nut 6 similarly threaded on the pipe and jammed against the inside of the wall 3.

The end of the pipe is provided with the threaded sleeve 7 having the flange 8 overhanging the end of the pipe and beveled as at 9 to protect the insulation on the wires 4 as they are drawn or "fished" through the pipe 1. The bead 10 is formed on the inner end of the sleeve 7, the outer end of which is castellated as at 11, to facilitate starting it onto the end of the pipe by hand.

The lock 6 is preferably blanked from heavy sheet metal in the form of a rosette having the crimped lugs 12—12 bent upward and inward over the tapered body of the sleeve 7, behind the head 10, to assemble it on the sleeve upon which it swivels between the inner bead 10 and the outer bead 13.

The distance between the diameter of the pipe and the bottom 14 of the outlet box leaves very little space for turning the lock nut 6 within the box, see Fig. 2. This limitation of space is necessitated by the shallow cross section of the wall within which the outlet box is embedded.

Ordinary wrenches and spanners are not practical for operation on the nut and sleeve 6—7. Electrical operators prefer to use pipe pliers for tightening the nut and sleeve. For that reason the castellated effect of the lugs 11—13 is preferred, because they can be engaged by pipe or ordinary pliers for tightening, without encircling them. For final "setting" of the jam nut 6 the lugs 12 may be driven around with a hammer and "drift". Because of the fire hazard it is important that the nuts 5—6 be tight.

Because of the limited space it is often a tedious, time wasting operation to thread a flat nut such as 5 onto the end of the pipe end 2 within the box and avoid "cross threading" the nut. It is also difficult to tighten such a nut without special tools, especially when the outlet boxes are in ceilings, dark spaces and other difficult positions.

The frictional engagement of the lugs 12—12 crimped onto the tapered body of the sleeve makes the combined nut and sleeve act as a whole in screwing them onto the pipe by hand.

The tapered body also makes it possible to elongate the nut 6 and sleeve 7 to compensate for a greater distance between the wall 3 and the flange 8. The resiliency of the lugs 12—12 is such that the nut and sleeve may be completely separated by backing the nut 6 away from the sleeve after the flange 8 abuts the end of the pipe. It is advisable to avoid this separation if possible, since the lugs 12 will retain the sleeve on the end of the pipe even though the thread engagement of the sleeve 7 with the pipe end 2 may be too free to frictionally hold the sleeve, or the thread too short to permit the flange 8 to jam against the end of the pipe.

Combining the nut 6 and sleeve 7 makes one less part to manipulate and provides a larger bulk more conveniently handled than either of them singly; neither will the lugs be mutilated by abusive use, which is one of the principal objections to the hexagonal nuts heretofore used.

Having thus described this invention what is claimed and desired to secure by Letters Patent is:

In combination with an outlet box, a threaded conduit extending into said box; a lock nut threaded on said conduit bearing against the outer wall of said box; an inner nut threaded on said conduit bearing against the inner wall of said box and having bendable lugs thereon; an externally tapered sleeve threaded on said conduit and swiveled within said lugs and having an internal flange adapted to engage the end of said conduit.

MAURICE H. NEWMAN.